UNITED STATES PATENT OFFICE.

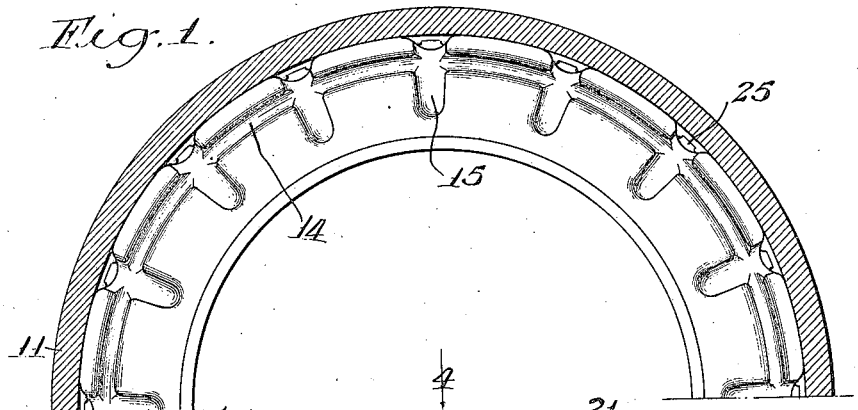
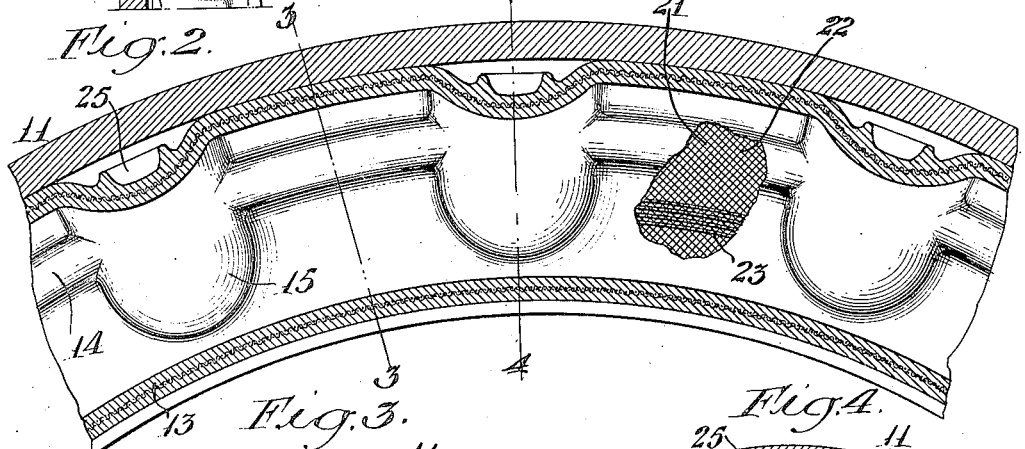
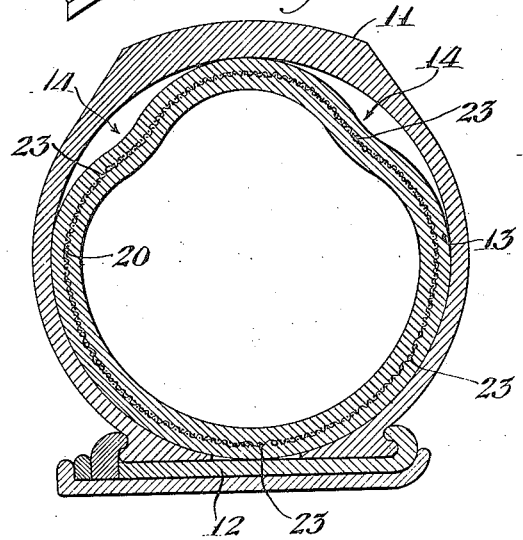
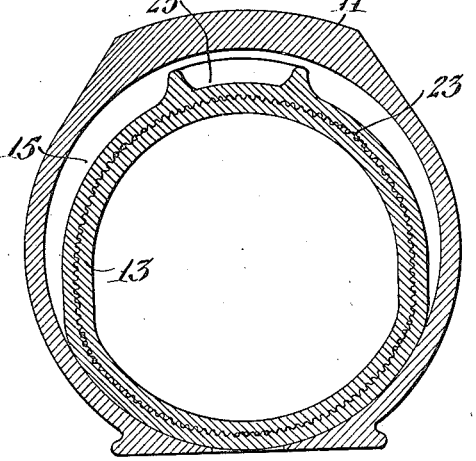

HERMAN LOBEL, OF LOS ANGELES, CALIFORNIA, ASSIGNOR TO COMPRESSION TUBE & TIRE CO., OF LOS ANGELES, CALIFORNIA, A BUSINESS TRUST.

TIRE.

1,423,232. Specification of Letters Patent. Patented July 18, 1922.

Application filed September 2, 1919. Serial No. 321,253.

*To all whom it may concern:*

Be it known that I, HERMAN LOBEL, a citizen of the United States, residing in Los Angeles, county of Los Angeles, State of California, have invented a new and useful Improvement in Tires, of which the following is a specification.

My invention relates to pneumatic tires, such as are used on automobiles and other vehicles, and the object of the invention is to provide an inner tube for such a tire which will automatically seal any puncture formed therein.

A further object is to provide an inner tube having vacuum cups formed thereon to prevent creepage.

Further objects and advantages will be made evident hereinafter.

Referring to the drawings which are for illustrative purposes only.

Fig. 1 is a view showing the casing in section and the inner tube in elevation.

Fig. 2 is a section on a somewhat larger scale showing both the casing and inner tube in section.

Fig. 3 is a section on a still larger scale on a plane represented by the line 3—3 of Fig. 2 with the inner tube deflated.

Fig. 4 is a section on a plane represented by the line 4—4 of Fig. 2 with the inner tube deflated.

In the form of the invention illustrated in these drawings, a casing 11 is shown, this casing being secured on any standard form of rim 12. Located inside the casing 11 is an inner tube 13, this inner tube embodying my invention and being provided with two circumferential corrugations 14 and a series of radial depressions 15. These depressions are forced outwardly by air pressure and disappear when the tire is fully inflated.

The purpose of the corrugations 14 and the depressions 15 is to provide an inner tube which will have a greater length around the circumference of the tire and which will have a greater length on a radial plane than the casing in which it is placed. Upon inflating the tire the entire body of the inner tube is put in compression both in a plane in which the axis of the wheel lies and about the circumference of the tire, there being what may be called a double compression. The inner tube is made relatively thick and is provided with fabric 20. If it is punctured as for example by a nail the highly elastic rubber of which the inner tube is composed is forced by the compression solidly against the nail entirely closing off any leaks that might tend to occur thereby. Upon withdrawing the nail the rubber is immediately forced together securely closing the leak.

For the purpose of strengthening the tube, I use the peculiar type of fabric shown in Fig. 2 in which 21 and 22 are diagonally woven threads, forming the fabric 20. At regular intervals I weave cords 23 into this fabric these cords being circumferential and greatly strengthening the fabric.

One great difficulty with ordinary inner tubes is their tendency to creep. This I correct by vacuum cups 25 moulded on the periphery of the tube in the depressions 15. When the tube is inflated these cups are forced against the inside of the casing preventing any movement of the tube in the casing.

I claim as my invention:—

1. An inner tube formed of sufficiently thick rubber to prevent crumpling and of greater length about its periphery than the casing in which it is to be used, said greater length being taken up by a series of radial depressions; and of greater length on a radial plane than the inside of the casing in which it is to be used, said greater length on a radial plane being taken up by one or more circumferential corrugations; said radial depressions and circumferential corrugations being forced outwardly when the tire is inflated thus placing the rubber of the inner tube in compression in two directions at right angles to each other.

2. An inner tube formed of sufficiently thick rubber to prevent crumpling and of greater length about its periphery than the inner surface of the casing in which it is to be used, said greater length being taken up by radial depressions which are forced outwardly when the tire is inflated thus placing the rubber of the inner tube in circumferential compression, and vacuum cups on the periphery of said tube in said depressions.

In testimony whereof, I have hereunto set my hand at Los Angeles, California, this 21st day of August, 1919.

HERMAN LOBEL.